May 29, 1956  C. B. HENDERSON  2,747,565
CONTINUOUS FEED STONE WORKING MACHINE
Filed Dec. 17, 1954  5 Sheets-Sheet 1
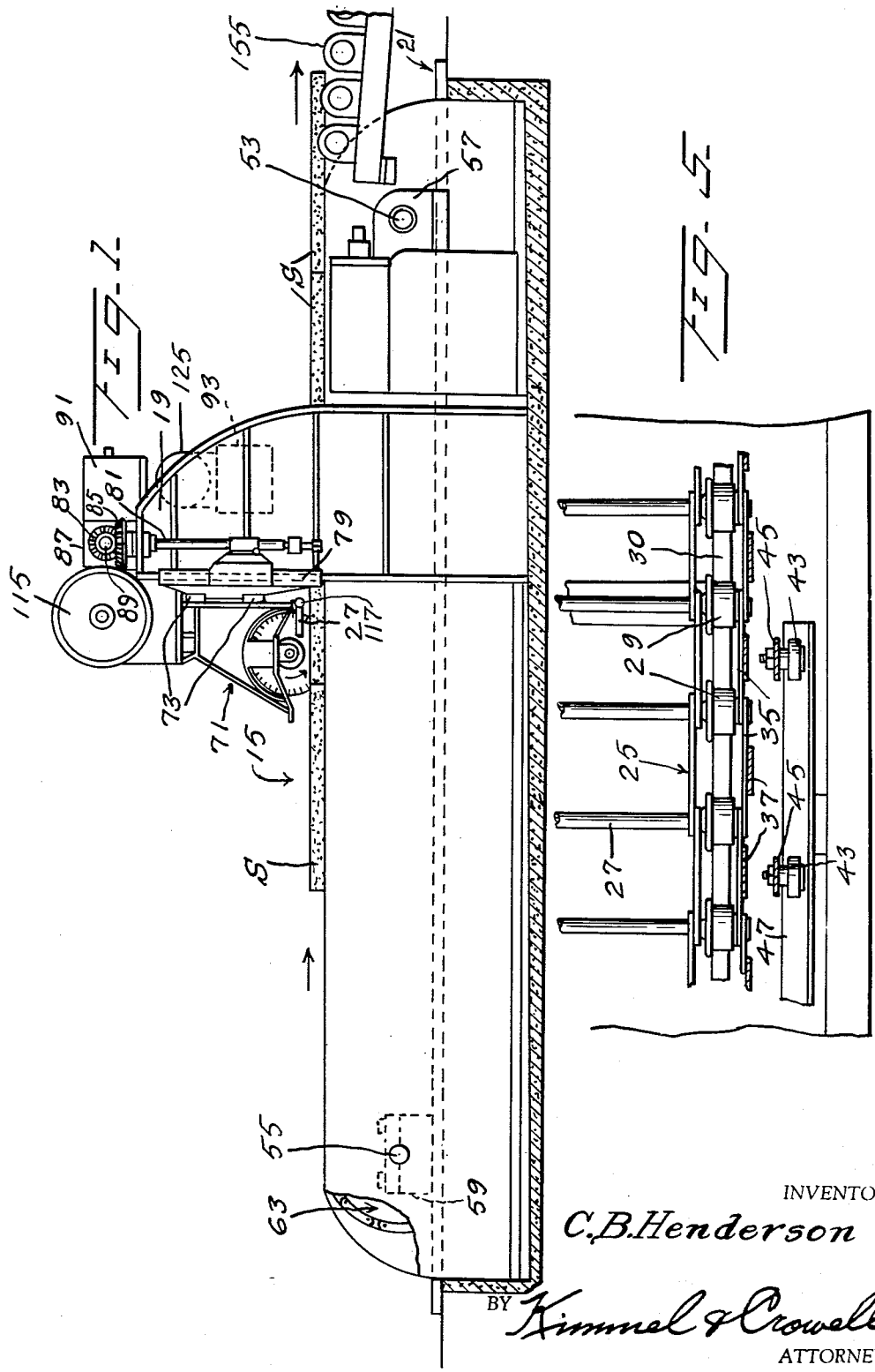

May 29, 1956  C. B. HENDERSON  2,747,565
CONTINUOUS FEED STONE WORKING MACHINE
Filed Dec. 17, 1954  5 Sheets-Sheet 2
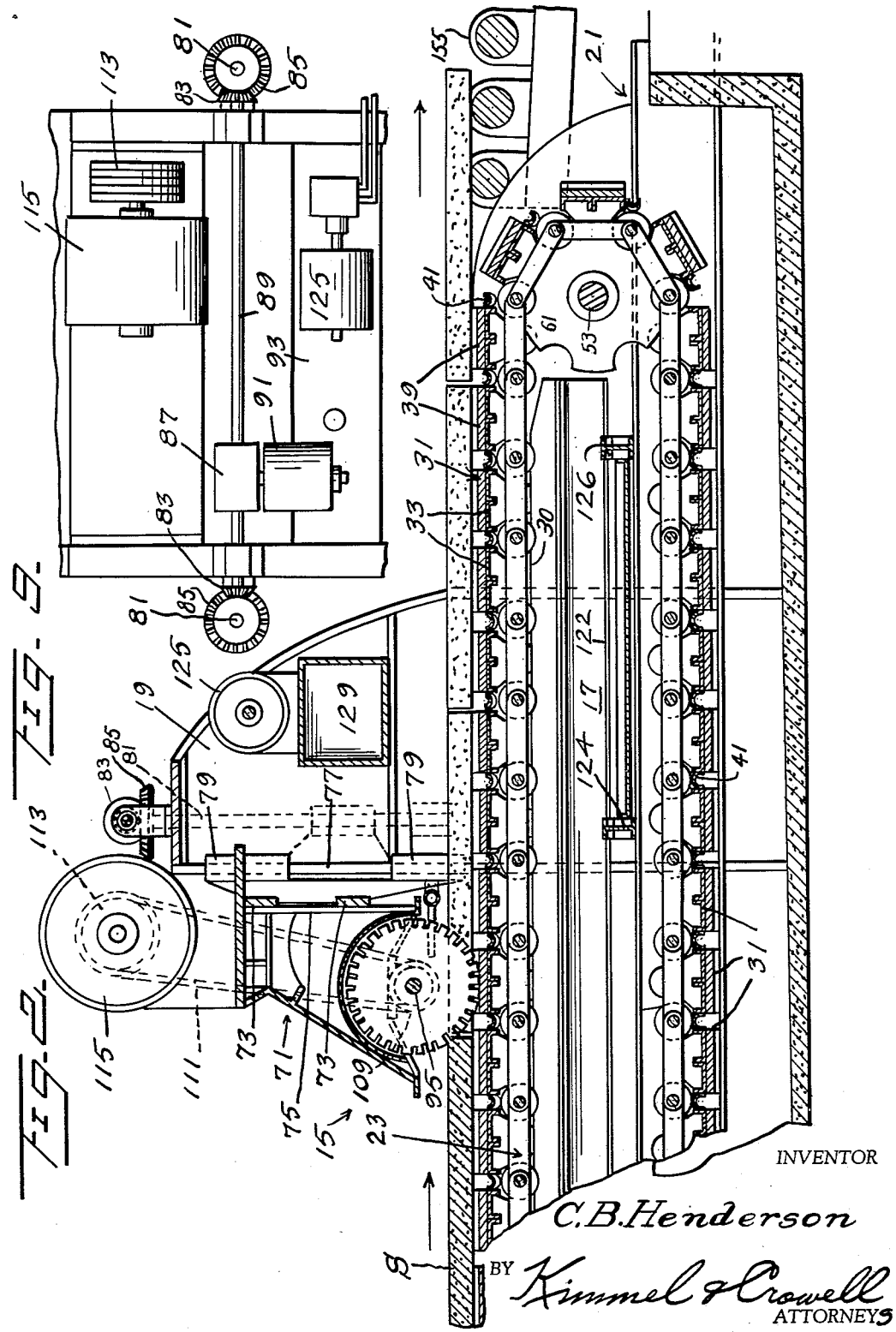
INVENTOR
C. B. Henderson
BY Kimmel & Crowell
ATTORNEYS May 29, 1956 C. B. HENDERSON 2,747,565
CONTINUOUS FEED STONE WORKING MACHINE
Filed Dec. 17, 1954 5 Sheets-Sheet 3
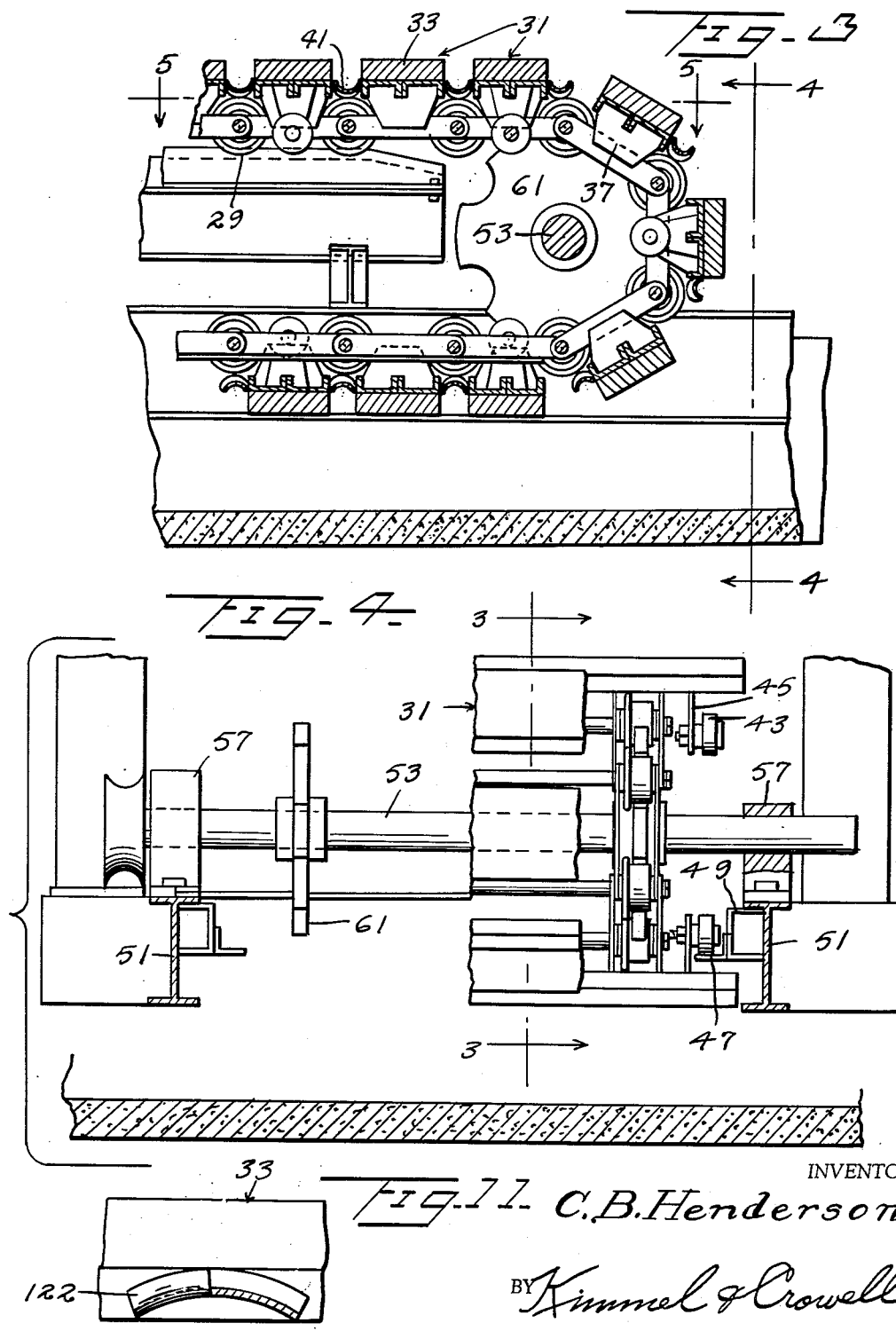
INVENTOR
C. B. Henderson
BY Kimmel & Crowell
ATTORNEYS

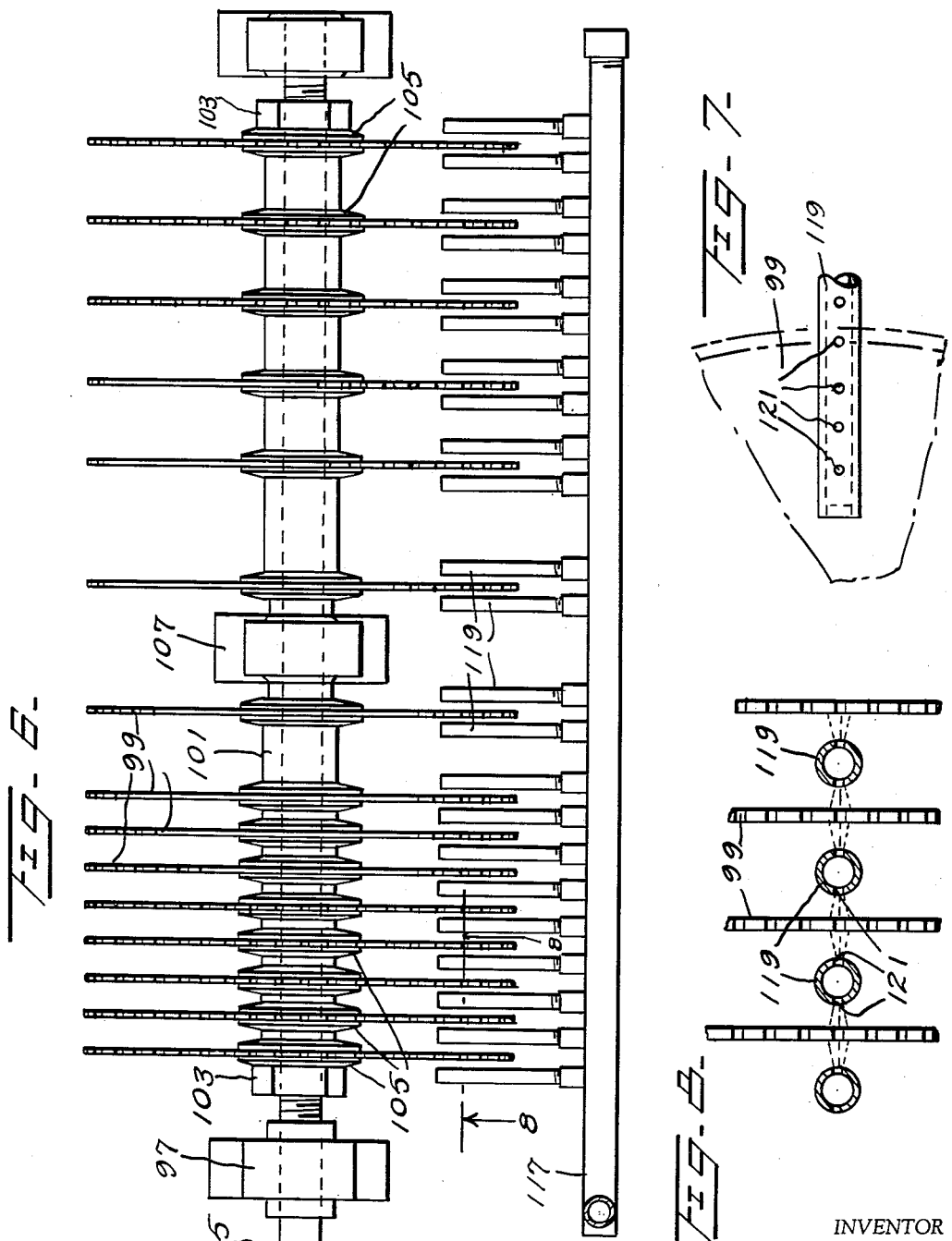

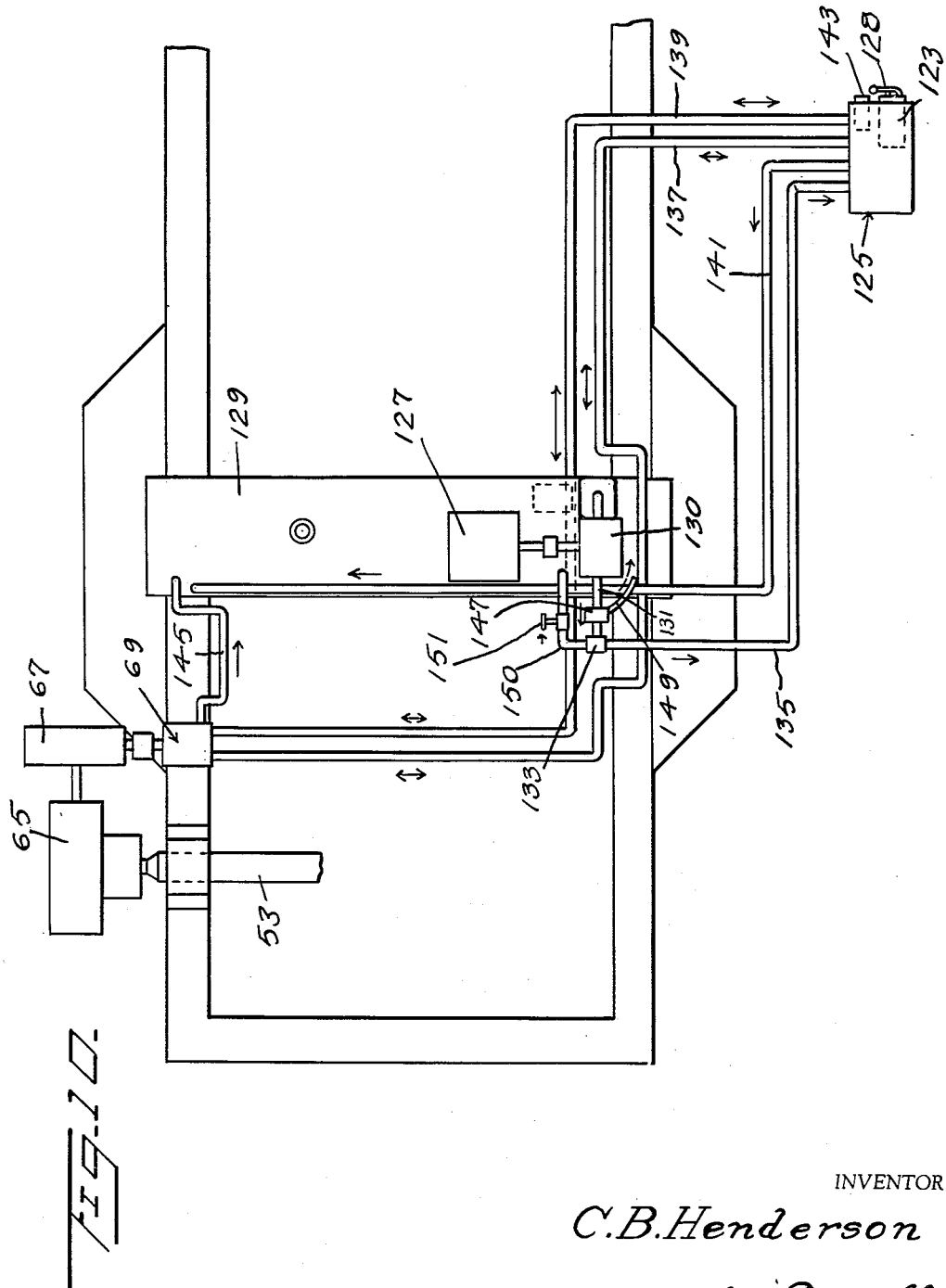

United States Patent Office 2,747,565
Patented May 29, 1956

2,747,565

CONTINUOUS FEED STONE WORKING MACHINE

Claude B. Henderson, Bedford, Ind., assignor to Ingalls Stone Company, Bedford, Ind., a corporation of Delaware Application December 17, 1954, Serial No. 476,009

4 Claims. (Cl. 125—13)

This invention relates to a machine for cutting stone slabs.

An object of this invention is to provide a stone slab cutting machine having an endless or continuous feeding mechanism which will greatly speed up the operation of cutting the stone.

Another object of this invention is to provide a machine for cutting stone which will practically eliminate the rejection item which in machines at present available has been a great factor in the operating cost.

A further object of this invetion is to provide a stone slab cutting or slicing machine which will accurately cut up the stone slabs, and which is so constructed and arranged that the loading and unloading of the machine is greatly simplified and can be accomplished without stoppage of the machine.

A further object of this invention is to provide a machine which is readily adaptable to the sawing of stone slabs and which may be extended to include milling, surface and form grinding stations, and the like.

Another object of this invention is to provide in a stone cutting machine an improved conveyor feeding means in the form of a hydraulic operator which will evenly move the conveyor at the desired speed.

With the above and other objects in view, my invention consists in the arrangement, combination and details of construction disclosed in the drawings and specification, and then more particularly pointed out in the appended claims.

In the drawings:

Figure 1 is a detail side elevation of a stone working machine constructed according to an embodiment of this invention.

Figure 2 is a fragmentary longitudinal section of the machine.

Figure 3 is a fragmentary vertical section taken substantially on the line 3—3 of Figure 4.

Figure 4 is a fragmentary sectional view taken on the line 4—4 of Figure 3.

Figure 5 is a fragmentary sectional view taken on the line 5—5 of Figure 3.

Figure 6 is a plan view of the gang of cutter blades and associated water spray means.

Figure 7 is a fragmentary side elevation of one of the water spray nozzles for the cutter blades.

Figure 8 is a fragmentary sectional view taken on the line 8—8 of Figure 6.

Figure 9 is a fragmentary plan view of the device.

Figure 10 is a diagrammatic view showing the hydraulic conveyor operating system.

Figure 11 is an enlarged fragmentary detail view of the water drip and slush pan.

Referring to the drawings, the numeral 15 designates in general, a stone working machine constructed according to the teachings of this invention. The machine 15 comprises a pair of oppositely disposed vertical side members 17 having a pair of upright side panel members 19 extending upwardly therefrom intermediate the ends of a substantially rectangular base frame indicated in general at 21. An endless conveyor, generally indicated at 23 is movably carried by the base frame 21 and is formed of a pair of double link chains each indicated at 25, which are connected together by means of connecting shafts or bars 27, as shown in Figure 5. There is a flanged roller 29 between the double links 25 which is adapted to engage a horizontally disposed guide rail 30. The oppositely disposed chains 25 have secured therebetween cleats, generally indicated at 31. The cleats 31 are formed of a pair of inverted substantially U-shaped channel bars 33 which extend transversely of the side members 17 and are secured to the outer links 35 by means of a webbing 37. Each cleat 31 also includes a concrete bar 39 which is fixed in any desired manner to the abutting channel members 33. The forward or leading side of the cleats 31 is also provided with an elongated arcuately-shaped slush guard 41 which extends transversely of the machine 15 to protect the flanged roller assembly from abrasive sludge.

At spaced intervals along the length of the conveyor 23, the channel members 33 extend laterally beyond the rail 30, and a roller 43 is rotatably carried by a web or plate 45 which is fixed to alternate ones of the cleats 31. The roller 43 is adapted to ride on an L-shaped track or rail 47 which extends inwardly from a channel member 49 fixed to the horizontal I-beams 51 at the sides of the base frame.

A pair of shafts 53, 55 is rotatably disposed between the side members 51 adjacent each end of the frame, and the shafts 53, 55 are journalled in bearings 57, 59. The shaft 53 has a pair of sprocket wheels 61 keyed thereto for engagement with each chain 25, and the shaft 55 has a pair of sprocket wheels 63 mounted thereon, of which one is keyed to and the other is free to rotate relative to its respective shaft. The shaft 53 is a drive shaft and is connected through a double reduction gearing 65 and 67 to a hydraulic or fluid operated power member 69, see Figure 10. The bearings 57 for the shaft 53 are fixed relative to their respective I-beams 51 whereas the bearings for the shaft 55 are adjustable longitudinally of the I-beams 51 to allow for conveyor tension adjustment.

A multisaw adapter designated, in general, by the reference numeral 71, is horizontally adjusted on the cross rails 73 and is secured thereon in adjusted position by gibs (not shown) or by other conventional means. The cross rails 73 are mounted on a vertically shiftable carriage generally indicated at 75 which engages vertically disposed guide means 77 carried between the upright panel members 19. The carriage 75 is adjusted vertically by means of a pair of screw shafts 81, which are connected by means of gearing 83, 85 to a reduction gearing 87 through a horizontal shaft 89, see Figure 9. The reduction gearing 87 is operated from a motor or power member 91, which is carried by a transverse supporting member 93 fixed between the vertical panel members 19. The carriage 75 includes slide members 79 engaging the guides 77. A horizontally disposed arbor or cutter shaft 95 journalled in bearings 97 carried by the adapter 71 has fixed thereon a plurality of spaced-apart circular stone cutting blades 99 which are spaced from each other by means of spool-shaped spacers 101.

A pair of nuts 103 are threaded on the shaft 95 and bear against washers 105 to hold the group of cutting blades tight with respect to the shaft 95. As shown in Figure 6, the carriage 75 includes an intermediate bearing 107 through which the shaft 95 rotatably engages. The shaft 95 at one end thereof has a pulley 109 fixed thereon about which driving belts 111 engage, and the belts 111 engage about a driving pulley 113 connected with a motor or power member 115 which is fixed on the upper end of the adapter 71.

The blades 99 are adapted to cut through stone slabs S disposed on the upper run of the conveyor 31 with the slabs S resting on the concrete cleats or bars 39. The carriage 75 is adjusted downwardly so as to cut entirely through each slab S and in practice the blades 99 also cut partly into the cleats 39, as shown in Figure 2.

The blades 99 are constantly lubricated with water from a horizontal manifold 117 carried by the carriage 75, and the manifold 117 has secured thereto a plurality of water nozzles 119 engaging on opposite sides of the blades 99 and provided with a plurality of jet openings 121, as shown in Figure 7. When the blades 99 are rotating they are constantly lubricated with water discharged from the nozzles 119 and the jet openings 121.

A water drip and slush pan 122 extends transversely of the machine 15 and is secured thereto on cross rails 124, 126. The pan prevents the slush from abrasively damaging the lower course of the roller assembly.

Referring now to Figure 10 of the drawings, wherein the hydraulic system employed to drive the shaft 53 is disclosed, the system is seen to be under the control of a three-way valve 123, mounted in a housing 125. The three-way valve has three positions, forward, neutral, and reverse. The forward and reverse functions are accomplished by reversing the flow of fluid to and from the driving motor 69. For example, with the three-way valve lever 128 in forward position, a pump 130 driven by a motor 127 furnishes fluid under pressure from the reservoir 129 through the pipe 131, the T-connector 133, the pipe 135, to the valve 123, and through the pipe 137 to the power member 69. The fluid returns to the reservoir through the pipe 139, the valve 123, and the pipe 141 to the fluid reservoir 129. With the valve lever in neutral position, fluid passes through the pipe 135, through the valve 123 and pipe 141, directly to the reservoir 129. With the three-way valve lever 128 in its reverse position, fluid under pressure is diverted from pipes 131, 135, the three-way valve 123, the pipe 139, to the power member 69 and is returned through pipe 137, the three-way valve 123, and the pipe 141 to the fluid reservoir 129.

Variation in feed speed is controlled by the metered amount of fluid by-passed from pipe 135 through the valve 123 and pipe 141 to the reservoir 129, as indicated by the meter 143.

Pipe 145 is a seal leakage return line from the power means 69 to the reservoir 129.

Valve 147 is a pressure relief valve connected in pipe 131, the fluid released by the pressure relief valve 147 being returned to the reservoir 129 through pipe 149.

An additional or auxiliary by-pass line 150 is connected with pipe line 135 at the T-connector 133 and with the reservoir 129. The auxiliary by-pass valve 151 in pipe line 150 is used only in case of an extremely slow feed speed requirement.

On the discharge end of the conveyor 23, a gravity conveyor 155 is secured, being inclined downwardly and forwardly, so that the cut stone will move downwardly and forwardly from the cutting machine hereinbefore described. The cut stone may then be conveyed to any suitable point of storage by gravity or power operated conveying means.

In use and operation of this machine, the slabs S are placed on the left end of the machine as shown in Figures 1 and 2 and are moved forwardly beneath the cutting blades 99. As the blades 99 are rotating from the power member 115, the blades will be lubricated by water or other liquid discharged from the nozzles 119. By providing the double reduction gearing 65 and 67, which is operated from the fluid power member 69, the movement of the conveyor 23 is reduced to a point where the cutting of the stone slab may be effected in a continuous operation.

Having described and illustrated one embodiment of this invention, it will be understood that the same is offered merely by way of example, and that the invention is to be limited only by the scope of the appended claims.

What is claimed is:

1. A stone cutting machine comprising a base frame, an endless conveyor disposed lengthwise of said frame, a saw carriage above said conveyor, guide means for said carriage carried by said frame, means vertically adjusting said carriage, a saw blade arbor rotatably carried by said carriage, a plurality of blades fixed on said arbor, means spraying the opposite sides of each blade with water, a fluid operator for said conveyor, means rotating said arbor, and a gravity operated conveyor extending from the discharge end of said endless conveyor.

2. A stone cutting machine comprising a base frame, upright side members carried by said frame, an endless conveyor disposed lengthwise of said frame, an operator for said conveyor, said conveyor being formed of elongated stone supporting slabs disposed transversely of said frame, chain links connected to the ends of said slabs, rollers carried by said links, upper rails for said rollers carried by said frame, a carriage above said conveyor, means vertically adjusting said carriage relative to said conveyor, stone cutting means rotatably carried by said carriage and operating means for said stone cutting means.

3. A stone cutting machine comprising a base frame, upright side members carried by said frame, an endless conveyor disposed lengthwise of said frame, an operator for said conveyor, said conveyor being formed of elongated slabs disposed transversely of said frame, chain links connected to the ends of said slabs, rollers carried by said links, upper rails for said rollers carried by said frame, a carriage above said conveyor, means vertically adjusting said carriage relative to said conveyor, stone cutting means rotatably carried by said carriage, operating means for said stone cutting means, means spraying water on said cutting means, and a gravity conveyor extending from the discharge end of said endless conveyor.

4. A stone working machine comprising a base frame, an endless conveyor carried by and extending horizontally and lengthwise of said frame, said conveyor being formed of a pair of endless chains, the links of one chain being connected with the links of the other chain by elongated pintles extending between said chains, transverse cleats fixed to the links of each pair of chains, a transversely disposed carriage above said conveyor, guide means for said carriage, and stone working means carried by said carriage.

References Cited in the file of this patent

UNITED STATES PATENTS

| | | |
|---|---|---|
| 1,336,563 | Hurford | Apr. 13, 1920 |
| 1,525,323 | Rabidou | Feb. 3, 1925 |
| 1,974,553 | Wilson | Sept. 25, 1934 |
| 2,170,687 | Johnson | Aug. 22, 1939 |
| 2,236,078 | Walter | Mar. 25, 1941 |
| 2,403,673 | Mead | July 9, 1946 |
| 2,450,371 | Coates | Sept. 28, 1948 |
| 2,467,113 | Deiters | Apr. 12, 1949 |
| 2,554,079 | Wilson | May 22, 1951 |
| 2,560,843 | Brosemer | July 17, 1951 |
| 2,587,199 | Neal | Feb. 26, 1952 |
| 2,636,320 | Knight | Apr. 28, 1953 |

FOREIGN PATENTS

| | | |
|---|---|---|
| 435,052 | France | Feb. 21, 1912 |